Jan. 20, 1948.  C. C. HIGGENS  2,434,798
CONTROLLING THE VISCOSITY AND FLOW OF FLUIDS
Filed July 13, 1943   4 Sheets-Sheet 1

Inventor
Cecil Cyprian Higgens
By Pierce + Scheffler
Attorneys

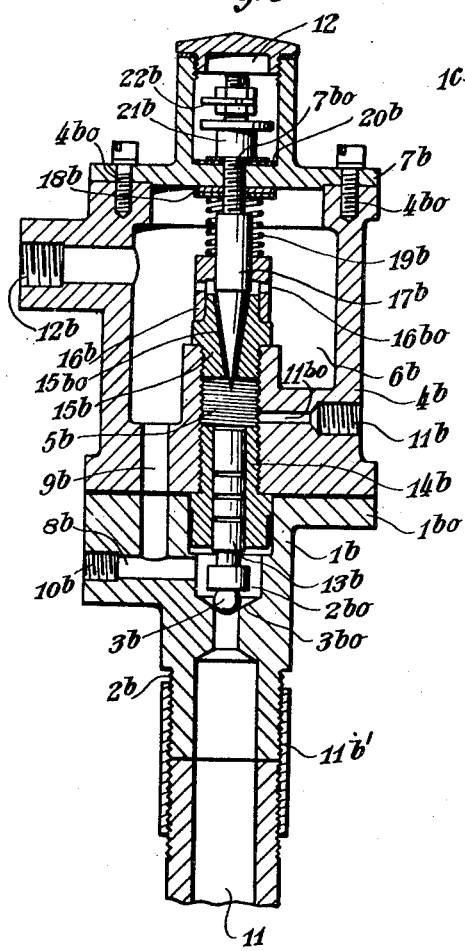
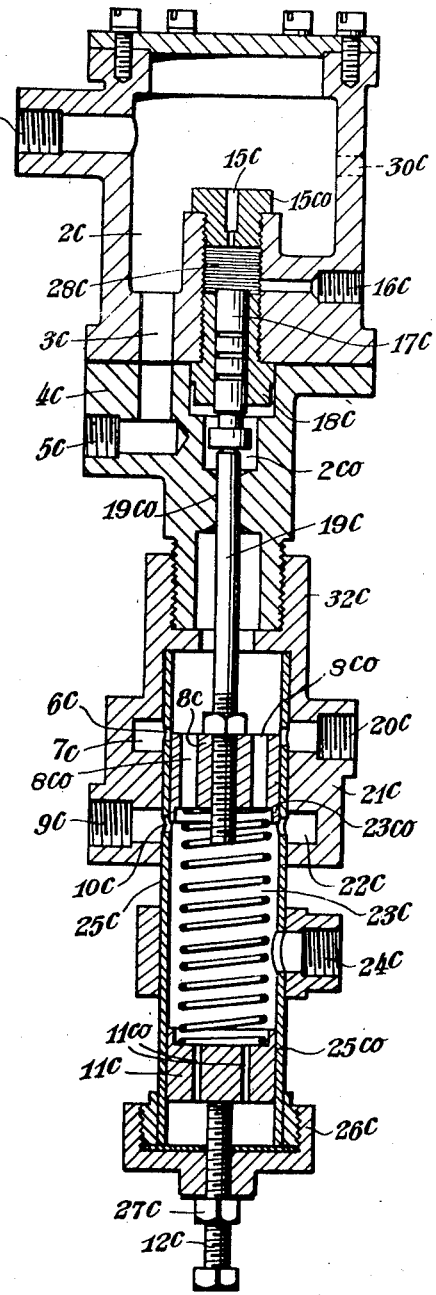
Fig. 3
Fig. 4

Jan. 20, 1948.　　　C. C. HIGGENS　　　2,434,798
CONTROLLING THE VISCOSITY AND FLOW OF FLUIDS
Filed July 13, 1943　　　4 Sheets-Sheet 4

Inventor:
Cecil Cyprian Higgens
By: Pierce, Scheffler & Parker,
Attorneys.

Patented Jan. 20, 1948

2,434,798

UNITED STATES PATENT OFFICE 2,434,798

CONTROLLING THE VISCOSITY AND FLOW OF FLUIDS

Cecil Cyprian Higgens, London, England, assignor to The Eyre Smelting Company, Limited, London, England, a company of Great Britain Application July 13, 1943, Serial No. 494,567
In Great Britain March 4, 1942

14 Claims. (Cl. 184—7)

1

This invention relates to controlling the viscosity and flow of fluids.

The present invention consists in the provision of a fluid pressure arrangement for loading automatically a pressure release valve or other device in sympathy with changes which may occur in fluid viscosity and the pressure arrangement comprises a constant output pilot pump free from excessive cyclical variations delivering into a pressure chamber, a flow-restricting orifice leading out of, and a floating plunger or piston connected into, said pressure chamber, together with if desired an immersion chamber surrounding both pressure chamber and orifice.

This invention further provides means for loading a release valve in such a manner as to maintain the fluid pressure in the main high pressure pipe line of, for example, a lubricating system at a value which ensures the maintenance of a predetermined constant rate of feed at each lubricating point.

In one form of device made in accordance with the present invention for use in a lubricating system I provide a regulator consisting of a loaded release valve connected into the main high pressure pipe line by means of a suitable conduit and arranged to bypass surplus lubricant, not required for lubricating purposes, through a conduit, or in other suitable manner, back to the main lubricant container connected to the inlet of the main lubricant pump. This valve is loaded by means of a floating plunger, one end of which rests on the valve whilst the opposite end enters a pressure chamber. The plunger is free to move in relation to the pressure chamber and will therefore exert a force on the release valve, proportional to any pressure which may be built up in that pressure chamber. A constant output pilot pump is arranged to deliver some of the lubricating fluid in use in the system into the pressure chamber, the only egress from which is by way of a restricting orifice generally corresponding to the type of metering device used for controlling the feeds to the various lubricating points.

The fluid pressure arrangement loads the release valve in the following manner.

The constant output pilot pump already mentioned is connected so that it draws from the stream of lubricating fluid passing through the system, and delivers into the pressure chamber within the regulator. The only outlet from the pressure chamber is by way of the flow-restricting orifice into the immersion chamber. The whole output from the pilot pump therefore

2 passes up through this restriction and joins the stream of fluid passing from the immersion chamber back to the lubricant container.

It will be evident that provided the orifice member is adjusted so as to form an appreciable restriction to the delivery from the pilot pump, a fluid pressure is built up within the pressure chamber. This pressure exerts a force upon the plunger which is transmitted to, and therefore loads the release valve.

It will also be evident that, since the output from the pilot pump remains constant, any desired fluid pressure can be obtained in the pressure chamber merely by adjustment of orifice value, and further, that when the orifice is fixed at any desired value and the viscosity of the fluid passing through the orifice varies for any reason whatsoever, the pressure in the pressure chamber must vary in sympathy.

In order that the viscosity of the fluid passing through the pressure chamber may correspond in value to that of the fluid flowing through a system of pipes, the temperature of the regulator should correspond reasonably closely with that of the pipe system as a whole. Lagging the regulator and pipe line leading thereto may be resorted to if these are so situated so as to be exposed to air at a temperature differing materially from that of the system as a whole.

Further, the provision of the immersion chamber surrounding the pressure chamber and restricting orifice and the passing of the stream of excess fluid through this immersion chamber ensures that level temperature conditions are maintained. This being the case the pressure developed in the pressure chamber and consequently the loading on the valve must vary with and always be proportional to the value of viscosity of the fluid in the system pipe line.

It has already been shown that the loading on the release valve is dependent upon the pressure exerted on plunger by the fluid pressure in the pressure chamber, therefore it is clear that the pressure at which surplus lubricating fluid will be discharged from the line must be proportional to and vary with pressure chamber pressure and hence with the viscosity of the fluid in the system pipe line.

Due regard is paid to the maximum quantity of lubricating fluid which can pass along the main high pressure pipe line and back through the return conduit to the regulator and the cross sectional areas of the various pipe lines arranged accordingly in order to avoid any detrimental effects due to excessive pressure drops.

For the satisfactory operation of the regulator it is essential that the restricting orifice within the regulator shall not become obstructed in service by accumulation of solid particles. In the preferred embodiment herein described an efficient filter capable of holding back all solid particles of appreciable size is situated between the main pump and the high pressure pipe line, which filter ensures that all the lubricating fluid circulating in the pipe lines of the system is free from solid particles of material size.

When the lubrication system is first put into operation, the maximum temperature at which the pipe line will be called upon to operate and the viscosity at such temperature of the lubricating fluid is proposed to use, are first ascertained. A suitable minimum main pipe line pressure is next determined. It is then a simple matter, either by actual test or by an examination of the viscosity temperature curve of the lubricating fluid concerned, to determine the correct line pressure for any given temperature of lubricating fluid and to adjust the flow-restricting device in the regulator to give that line pressure. Having made this adjustment the regulator will function indefinitely and automatically without further attention.

In this embodiment of the invention the main pump runs continuously during lubricating periods and is arranged to deliver substantially more fluid than is required for lubricating purposes in the system.

Cyclical variations in the output of the pilot pump have been referred to. The advantage of a steady output from this pump lies in the fact that a steady main pipe line pressure is maintained by the regulator when a pilot pump having a steady output is fitted. In practice, however, a certain amount of latitude is permissible in this respect without detriment to the efficient working of the lubricating system. When, for any reason, such cyclical variations have a greater magnitude than is deemed desirable, I provide a small air chamber or pocket either within the pressure chamber or connected thereto in any suitable manner. The air entrapped in said chamber acts as an elastic cushion and to some degree damps out pressure variations within the pressure chamber due to cyclical variations in pump output.

Further, in certain alternative embodiments of the regulator a small high efficiency filter may be incorporated in the pilot pump circuit in addition to or in place of the filter unit, described in this preferred embodiment.

The invention as applied to pressure control, and particularly as used in a lubricating system, is hereinafter described by way of example with reference to the accompanying diagrammatic drawings, in which—

Figure 3 is a sectional elevation of the pressure control device.

Figure 4 is a sectional view of the control device cooperating with a two-way valve.

Figures 5, 6 and 7 are diagrammatic layouts of the apparatus in which the valve illustrated in Fig. 4 is employed showing the manner in which it may be connected.

Figure 1:
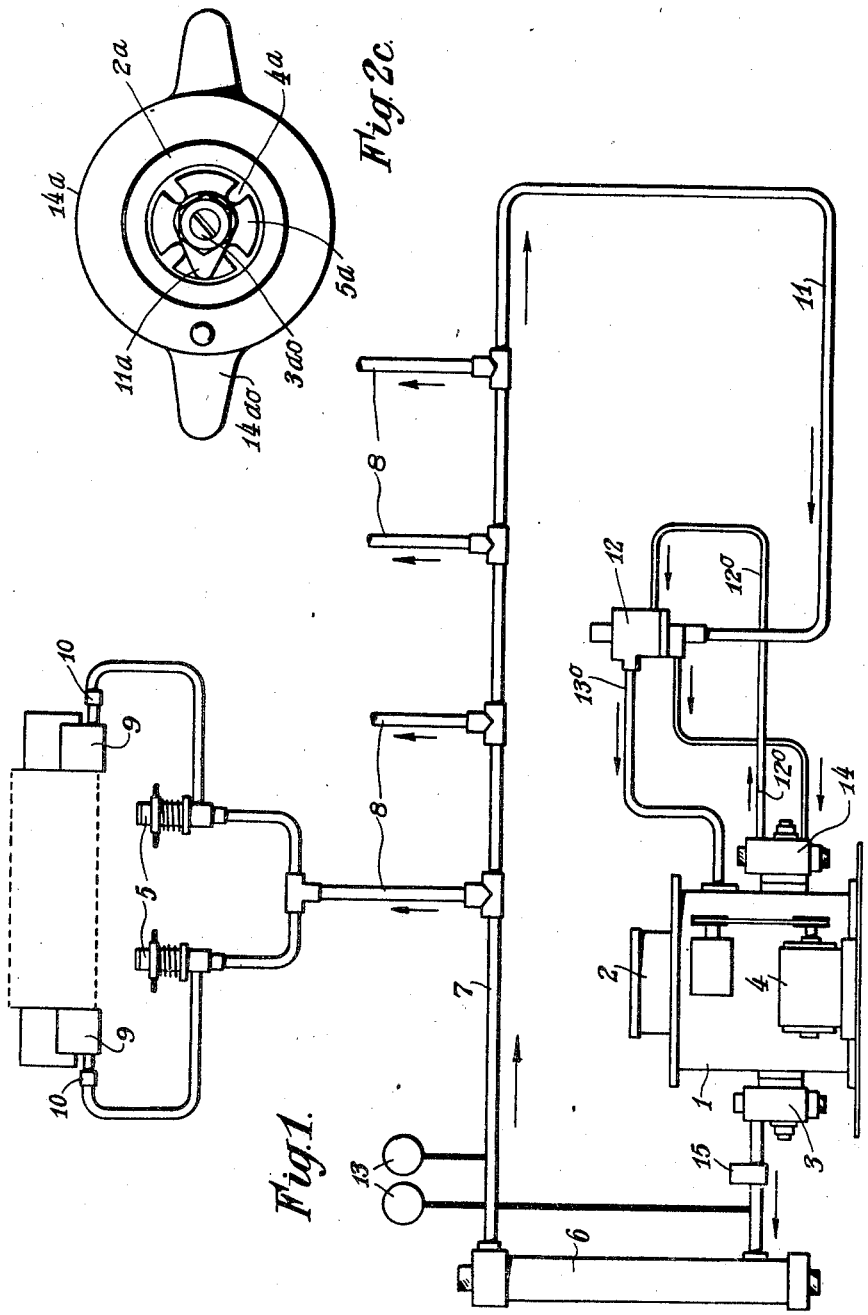
Figure 1 is a diagrammatic view illustrating the pressure control device applied to the lubricating system.

Referring to Fig. 1; reference 1 represents the lubricant container which may be provided with an oil strainer 2 and into which is connected main pump 3 which functions continuously during lubricating periods. It is driven by some suitable source of power, such as electric motor 4. Pump 3 draws lubricant from 1 and delivers it to the metering or control devices 5 through filter 6, main pipe line 7, and branches 8. The metering or lubricant control devices 5, (two only of which are shown on the diagram) are connected to, and control the flow of lubricant into, the various lubricating points 9, through bayonet or like connections 10. Return pipe 11 is connected into the base of a device 12 and a conduit 13° leads from the side of 12 into lubricant container 1. The pressure controlling device 12 is hereinafter described in detail. Driven also by electric motor 4 or by other suitable constant speed drive is a small constant output pump 14, referred to as the pilot pump. The pilot pump 14 must be capable of delivering a steady output free from excessive cyclical variation and is connected to the pressure control device 12 by a pipe 12°. A double plunger, cam driven, pump may, for example, be employed. Pilot pump 14 draws a supply of lubricant from some suitable point and delivers at constant rate under all conditions of viscosity and pressure into a pressure chamber within device 12.

Suitable pressure gauges 13, safety devices such as an over-pressure warning relay 15, and any other suitable device may also be fittted, but such devices are not essential to the working of the system.

The main pump operates continuously during lubricating periods. Excess lubricant not required for lubricating purposes returns by way of return line 11 and pressure controlling device 12, to the lubricant container. The main line pressure is, in this embodiment, in accordance with the present invention maintained automatically at a value proportional to the viscosity of the lubricating fluid in 7 by device 12, as will hereinafter be described.

The metering device comprises the body 1a, which has a spindle carrier 2a screwed into it. The conical valve spindle 3a has a threaded extension 3ao which is screwed through a hole 2ao in the central portion of spindle carrier 2a, entering into a chamber 4ao formed in the upper part of spindle carrier 2a where an oil seal is effected by means of cork washer 4a and locking member 5a. Member 5a also serves to lock spindle 3a in any desired position. Cap 6a is provided for the exclusion of dirt, and the like.

The cone 5ao at the lower end of spindle 3a co-operates with a conical orifice 6ao of like angle formed in base 7a. A guide piece 8a fits over a turned portion 7ao on 7a and both act as a guide for spindle 3a and a platform for spring 9a. The function of spring 9a is to press cup leather 10a against the lower end of spindle carrier 2a. This cup leather fits a smooth bore in the centre of the body. Thus an effective seal is provided against oil leaking past the threads on the outer periphery of spindle carrier 2a. A small pointer 11a indicates the degree of opening of orifice 6ao formed by the co-operation of spindle 3a and base 7a. Should it be desired either to flood a bearing or to remove an obstruction in the restricted orifice formed between the cone 5ao and its seating 6ao, the spindle carrier 2a is manually rotated by means of the handles 14ao provided on ring 14a which is fixed to the upper part of carrier 2a, in such a manner as partially to withdraw carrier 2a from body 1a, the conical valve spindle 3a being at the same time partially removed from its seat. When the handles on ring 14a are released, a strong close-coiled spring 12a anchored between anchoring ring 13a fixed to the body 1a and the ring 14a causes carrier 2a to rotate and return to the normal position in which contact is made along rim 15a. The device is connected to the branched pipe system, by means of a connection 16a in base 7a. A pipe connected at orifice 17a leads the lubricant to the lubricating point.

A lightly loaded ball valve (not shown) may be incorporated in the bearing end or in any other part of the pipe leading from connection orifice 17a in order to prevent drainage of lubricant and entry of air into the system during non-lubricating periods.

A long rather than a short restricted path is provided past the valve member, a positive seal is obtained between the body and the spindle carrier by the incorporation of cup leather 10a and the construction is generally robust and the device protected from interference.

A pressure controlling device made in accordance with the present invention is illustrated in the sectional drawing Figure 3 in which a flanged base 1b has an entry at pipe connection 2b and in which is incorporated a release valve formed by ball 3b seated at 3bo. Fixed firmly by screws or bolts (not shown) to the upper face of flange 1bo on base 1b is the body 4b. A central axial passage is provided in 4b which forms pressure chamber 5b. The upper portion of body 4b is hollow forming immersion chamber 6b which is closed by cover 7b, secured by screw 4bo to body 4b. Passages 8b and 9b formed in base 1b and body 4b connect the valve chamber 2bo surrounding ball 3b with immersion chamber 6b. A small pipe entry 10b leads into passage 8b and a similar small entry 11b leads through a passage 11bo into pressure chamber 5b. A larger pipe connection 12b leads out of chamber 6b. A plunger 13b rests on ball 3b and slides freely in guide 14b screwed into the lower end of the central axial bore forming pressure chamber 5b. Into the upper end of chamber 5b is screwed a coned-orifice member 15b provided with a guide and spring platform unit 16b. Passing through guide 16b, cooperating with the coned orifice 15bo and screwed through cover 7b is a conical valve member 17b which may be adjusted to establish different degrees of restriction to the escape of liquid from the pressure chamber, whereby the liquid pressure may be adjusted over a range suitable for the system in question. The threaded passage 7bo through cover 7b is sealed on the underside by cork washer 18b held firmly in position by spring 19b. On the upper side within the chamber formed on 7b a further seal to the passage 7bo is obtained by means of cork washer 20b and locking member 21b. There is a point at 22b to indicate the amount of opening of the orifice 15bo.

Figure 2:
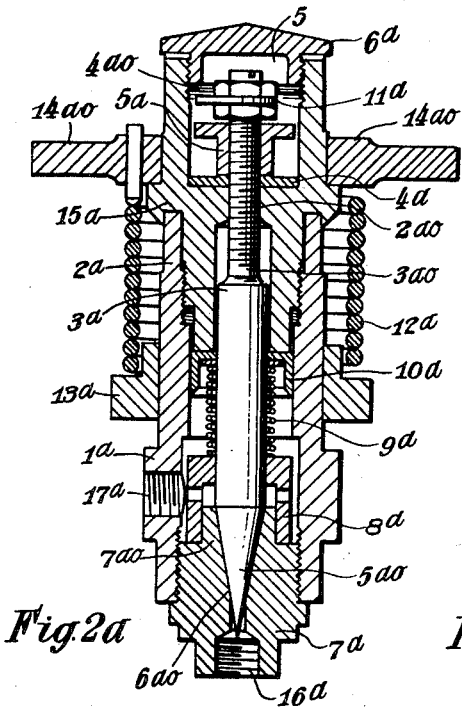
Figures 2a, 2b, 2c, are respectively a sectional general arrangement, an elevation at right angles to Fig. 2a, and a capless plan of the metering device.

The arrangement described forms an adjustable orifice of a like nature to that obtained in the metering device illustrated in Figure 2.

The manner in which this device operates to regulate pressure is as follows:

The return pipe 11 (Fig. 1) from the lubricating system is connected into 2b by a sleeve 11b'. All excess lubricant flows up past ball 3b into immersion chamber 6b and out through pipe connection 12b into pipe 13° leading back to the lubricant tank 1.

The suction side of the pilot pump 14 (Fig. 1) is in this embodiment connected into pipe entry 10b. It delivers at a constant rate through pipe 12° and passage 11b into the pressure chamber 5b. The only egress from chamber 5b is by way of restricting orifice 15bo and orifices 16bo. Provided the valve member 17b is suitably adjusted in relation to pilot pump output a pressure will be built up in chamber 5b of the magnitude necessary to force the whole of the output of the pilot pump 14 through the restricting orifice 15bo. That pressure will exert force upon the plunger 13b which is transmitted by said plunger to ball 3b which forms the release valve past which all excess lubricant flows. It will be evident that the force exerted upon this ball determines the pressure at which excess lubricant will be released and likewise, therefore, determines the pressure maintained in the main pipe line. Further, it will be evident that as and when the viscosity of the fluid passing through chamber 5b varies from any cause, the fluid pressure in chamber 5b will vary proportionately, resulting in the fluid pressure in the main pipe line varying in a like manner.

In order that the viscosity of the fluid passing through chamber 5b may correspond with that of the lubricant in the main pipe line 7, steps are taken to maintain the pressure control device at a temperature substantially close to that of the pipe line system as a whole as already described. Further it will be evident from the drawing that the arrangement of the immersion chamber 6b has a marked effect upon the preservation of equal temperature conditions notwithstanding any local heating or cooling which may occur in the slow-moving stream of lubricant passing through the pilot circuit.

Provided that substantially level temperature conditions are maintained as above described the main pipe line pressure will be maintained automatically at a value which will produce a uniform rate of discharge through each metering device connected to the system notwithstanding wide changes in the viscosity value of the lubricant from any cause whatsoever.

Broadly speaking the invention may be applied in two distinct manners. In one type of application the force exerted on the floating plunger connected into the pressure chamber is directly balanced by a corresponding force exerted on the plunger by the mechanism controlled by the device. The previously described embodiment in which the plunger force acts directly upon and operates a release valve is an example of an application in the first category. An entirely different class of application is where the force exerted on the plunger is balanced by a force exerted by some form of spring and when the position taken up by the floating plunger and any extension thereof, when the same is in equilibrium, is utilised for operating some subsidiary mechanism.

Applications coming into the first category are, generally speaking, those in which it is desired to obtain and use directly a force proportional in magnitude to the value of the viscosity of a fluid. An embodiment in this category in which the device co-operates with a suitable valve is particularly applicable to the maintenance of the relationship pressure/viscosity at some constant value. It will be obvious, however, that other types of mechanisms requiring for their operation a force directly proportional to the viscosity of the fluid in a system may likewise be operated by means of a device constructed generally as already described.

An application coming into the second category is shown by way of example in Figs. 4 and 5. The object of this embodiment is to provide means for maintaining a fluid, which is subject to heating, at a constant viscosity by means of the device co-operating with a spring-balanced, two-way valve and a radiator or other cooler unit. An application of this nature is of value for holding at constant value the viscosity of a lubricating oil passing into an internal combustion engine or other heat-producing mechanism. The unit, as a whole, is subsequently referred to as the viscosity controller.

Referring to Fig. 4, the upper or operating portion of the unit resembles in its upper part the device illustrated in Fig. 3, already fully described, except that the restricting orifice 15c is non-adjustable and is provided in an orifice plate or jet 15co. There is no connecting passage between immersion chamber 2c and the cavity 2co surrounding the lower end of the floating plunger 17c. Finally, in place of the ball valve, shown in Fig. 3 the plunger 17c rests upon a valve spindle 19c.

Plunger 17c is provided with a base of larger diameter than the bore of guide 18c. Contact between this base and the lower face of the guide forms a stop limiting the upward travel of the plunger and valve spindle. In a similar manner contact between the lower face of the base of the plunger and the bottom of the cavity which surrounds this, acts as a stop limiting the downward travel of the plunger and valve spindle.

Briefly, connection 1c leads out of immersion chamber 2c. Pressure chamber 28c is fed through pipe connection 16c. Floating plunger 17c slides freely in plunger guide 18c. Passage 3c connects immersion chamber 2c with pipe connection 5c. Screwed or otherwise firmly connected to base 4c is member 21c in which are formed two annular passages 7c and 22c into which lead pipe connections 20c and 9c. Sweated or otherwise firmly fixed into member 21c is a tube 25c. Two series of small holes, or ports, 6c and 10c connect the inside of tube 25c with the above mentioned annular passages. A pipe connection 24c is provided connecting into the lower portion of tube 25c in any convenient manner. The lower end of tube 25c is closed by cap 26c through which passes adjusting screw 12c, which is secured by lock nut 27c. Resting on adjusting screw 12c is spring pad 11c channelled at 11co which slides freely within tube 25c. The bore 25co of tube 25c is both smooth and true throughout its length. Situated in the upper portion of this bore 25co is a valve member consisting of a piston 8c adjustably secured to valve spindle 19c. The piston 8c is made with axial passages 8co which permit the free passage of fluid from the lower to the upper part of the bore 25co. Furthermore piston 8c is a sufficiently free fit in the bore 25co to enable the piston 8c to move therein freely without appreciable friction. Valve spindle 19c passes up into the operating portion of the device and contacts plunger 17c. The hole 19co through which spindle 19c passes up to the plunger 17c, whilst acting as a guide, is of appreciably larger diameter than the spindle 19c in order that any displaced fluid may flow freely into or out of the chamber 2co surrounding the lower end of the floating plunger 17c.

A suitably proportioned spring 23c rests on spring pad 11c, and is accommodated in a recess 23co on the lower side of piston 8c and pushes the piston 8c together with the spindle 19c and plunger 17c, upwards.

The spring pressure is adjustable by means of adjusting screw 12c.

The length of piston 8c corresponds to the centre to centre dimension between the two series of ports 6c and 10c so that when the piston 8c just covers one set of ports the other set are fully open. Furthermore piston 8c is adjusted on spindle 19c in such a manner as to be approximately central in respect to the two series of ports when plunger 17c is in mid-position. This adjustment is not critical.

The viscosity controller illustrated in Fig. 4 is connected and employed in the following manner as shown with reference to Fig. 5 which illustrates diagrammatically an application of the device for controlling to any desired value the viscosity of the lubricant supplied to an internal combustion engine or other similar heat producing mechanism. It should be noted that numbered references to same parts in Figs. 4 and 5 correspond.

Such an engine would be provided with an oil circualtion pump usually made integral with the engine. In this embodiment of the invention the delivery side of such pump is connected to pipe entry 24c by pipe 24co. Oil flows through entry 24c into the viscosity control device 32c designated generally corresponding to mechanism shown in Fig. 4 hereinbefore described in detail with reference thereto and passes out, as will later be described, either through connection 9c or connection 20c or partly through both. Outlet 9c is connected to an oil radiator or cooler unit 28co by a pipe 9co. Connection 20c is directly connected to entry 5c by way of pipe 20co and junction 29c at which point the outlet from the radiator or cooler 28co enters by way of pipe 29co. It will be evident that in its passage from inlet 24c to inlet 5c the oil stream can travel either wholly or partially through cooler 28co, or, alternatively, may by-pass that unit. Entering at inlet 5c the stream flows through the immersion chamber 2c (Fig. 4) passes out through connection 1c and is led through a short pipe 1co to a suitable connection in the engine leading into the normal lubricant distribution channels or gallery in the engine.

An oil pump 31c, subsequently referred to as a pilot pump, is provided. This pump is driven by an electric motor or other suitable source of power at constant speed irrespective of engine speed. The output of the pump is low but must be constant throughout the range of fluid viscosity within which the viscosity control device is required to operate. A suitable meshed-gear pump may, for example, be employed. At any convenient point, such as 30c, the suction side of the pump 31c is connected by a pipe 30co into the oil stream. The delivery side is led by a pipe 31co to connection 16c on the viscosity controller 32c.

The manner in which the device operates is herewith described with reference to Figs. 4 and 5. When the engine is started up pilot pump 31c is also put into operation. The stream of lubricant enters the device at 24c.

Initially since there is no pressure in pressure chamber 28c spring 23c holds piston 8c and plunger 17c in their uppermost position, in which ports 10c are fully open and ports 6c closed.

The oil stream passes through cooler 28co, through junction 29c, into the immersion chamber 2c through connection 5c and out to the lubricant entry in the engine by way of pipe 1co leading out of 1c. Concurrently pilot pump 31c draws a supply from this stream by way of outlet 30c and pipe 30co and delivers through entry 16c into pressure chamber 28c. The only outlet from chamber 28c is by way of the restricting orifice 15c. If this restriction 15c is of suitable size in relation to the pilot pump output a fluid pressure is built up which acts on plungers, 17c causing piston 8c to travel downwards against the pressure from spring 23c either to the lower permissible limit of travel of the combination or to a position of equilibrium in which spring pressure balances the force exerted by the floating plunger, in either case closing ports 10c and opening ports 6c. Cooler 28co is immediately cut out, the stream flowing direct from outlet 20c to inlet 5c and continuing as before to enter the engine by way of outlet 1c and the short pipe 1co leading therefrom.

As the engine continues to function the sump oil temperature rises. Since the pipe 1co connecting 1c the engine is short the oil flowing through immersion chamber 2c will be at substantially the same temperature as that of the oil entering the engine. Both the walls forming pressure chamber 28c and jet 15c being immersed in this same oil the temperature of the pressure chamber will be maintained at substantially like value.

As the oil temperature rises in the main stream the fluid viscosity falls. Since the quantity passing through the pilot circuit into chamber 28c is constant and the orifice 15c is also constant, and since the temperature in chamber 28c follows the rising temperature of the main stream substantially closely, the fluid pressure in chamber 28c must fall in sympathy with the falling viscosity. As a result spring 23c causes both piston and plunger to rise. This continues until the temperature and viscosity of the main stream have reached such a value as to cause piston 8c to commence to uncover ports 10c. Some portion of the main stream is immediately diverted through cooler 28co. The refrigerating action of this device, provided it is of sufficient capacity, quickly establishes a state of viscosity equilibrium in the main stream. Any increase in heat input into the engine oil results in a slight drop in pressure chamber pressure and causes piston 8c to be raised, increasing the proportion of oil flowing through cooler 28co. A decrease in heat input has the reverse effect. Close regulation of the viscosity of the oil passing into the engine is thus obtained.

Raising spring platform 11c by means of adjusting screw 12c increases spring pressure and raises the viscosity value at which equilibrium is established. Lowering platform 11c has the reverse effect. Screw 12c may be connected up in any suitable manner with an indicating device reading directly in viscosity values and the control device may then be readily set to control the main lubricant stream at any desired viscosity within the range permitted by the type of lubricant, the heat input into that lubricant and the cooling capacity of the cooling device.

Figure 6:
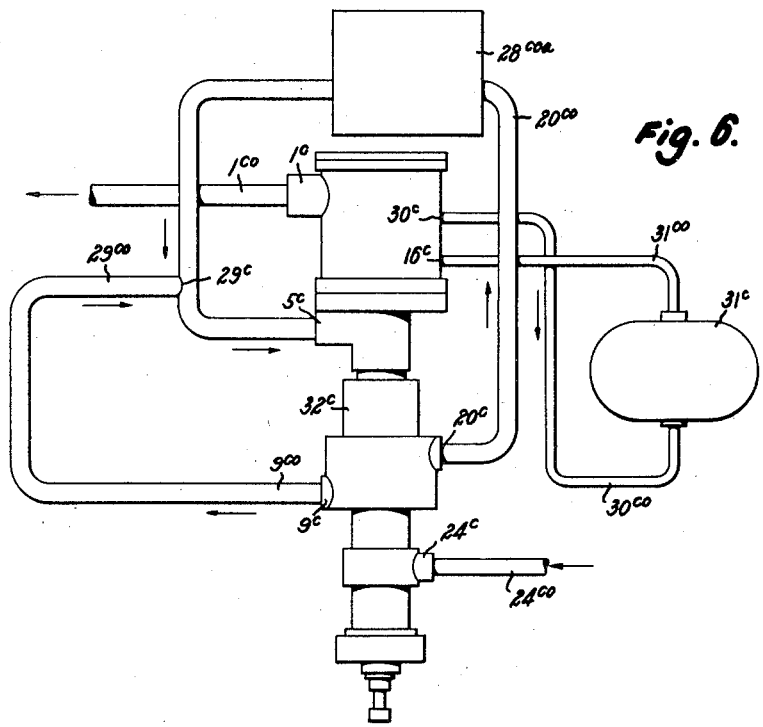
Figure 7:
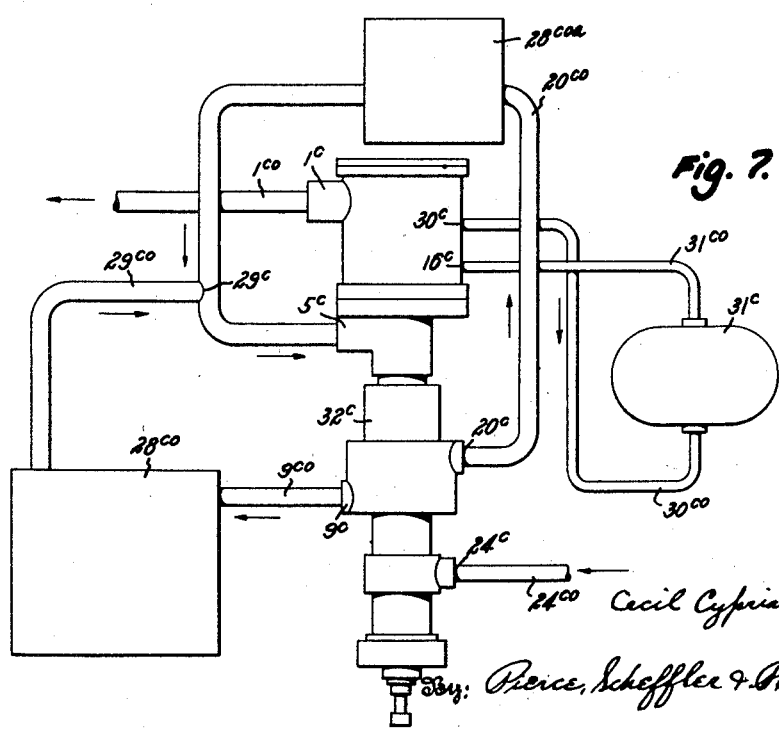

It will be clear that, whereas in the above application of the invention viscosity control of a fluid tending to become overheated is effected by regulating the proportion of the fluid which is caused to pass through a cooling device, a similar control may be exercised over the viscosity of a fluid subject to heat extraction merely by using a heater 28coa connected between connection 20c and junction 29c, as illustrated in Figure 6, in place of cooling device 28co. Further, if conditions affecting the main stream are such that both heating and cooling may at different times be necessary to maintain correct viscosity, both a heater 28coa and a cooler 28co may be incorporated simultaneously, as illustrated in Fig. 7. The remaining reference numerals in Figs. 6 and 7 correspond to those in Fig. 5.

Some of the applications for which the fluid pressure device may be employed are summarised below:

The control of a release valve in order to regulate fluid pressure so as to maintain the relation pressure/viscosity at any constant value with the object, for example, of ensuring a constant rate of discharge of fluid through metering orifices, as may be required in a lubrication system, a fuel oil firing system, and various processes concerned with the flow of viscous or semi-viscous fluids.

The control of a mixing valve in such a manner as to cause two or more fluid streams to combine in such proportions as to maintain within close limits any desired viscosity in the mixture. One such application is in connection with the lubricating systems applied to various prime movers such as aircraft engines, road vehicle engines, Diesel locomotive engines, marine and stationary Diesel engines, steam turbines, and the like, and similar units of plant in which it is desirable automatically to control the proportion of lubricant passing through a cooler so as to maintain a pre-determined value of viscosity in the lubricant passing into the engine or other unit of plant. Such a device is also adaptalbe for the automatic blending of oils and for the mixing or blending of other viscous or semi-viscous fluids, and for the control in a hydraulic system either of a cooler or heater circuit, or both, in such a manner as to maintain the viscosity of the fluid in the system at any desired value, within close limits, irrespective of the temperature of the atmosphere surrounding the hydraulic mechanism.

The closing and/or opening of electrical contacts when various pre-determined viscosity values obtain in a fluid, such electrical connections being used for alarm or indicating purposes or for setting in motion subsidiary machinery.

Setting into operation numerous types of mechanisms when the viscosity of a fluid reaches a certain pre-determined value or values.

For the construction of viscometers of the recording or indicating type and many other uses.

One important advantage possessed by the device is that since the working pressure in the pressure chamber, the cross sectional area of the floating plunger and the output from the pilot pump can be given any desired values within wide limits, the force available for operating mechanisms connected to the device may, if required be a very considerable one.

In addition to its value as an adjunct to the lubricating system, it has a wide field of usefulness in connection with the control or manipulation of fluids and for the operation of sundry types of known mechanisms which are in any way connected with or dependent upon the viscosity of a fluid.

The details of construction may be varied in many ways without departing from the scope of the invention.

What I claim and desire to secure by Letters Patent is:

1. A lubricating system of the type including a pump circulating a lubricant in a closed path from and back to a lubricant container, branch pipe extending from said closed path to lubrication points, and an adjustable pressure-responsive valve for regulating the liquid pressure within said closed path, said valve being situated at the terminal end of the path leading back into the lubricant container and being movable in one direction by the liquid pressure within said system; characterized by the fact that means responsive to the viscosity of the circulating lubricant imposes upon said valve a loading force that varies progressively with the viscosity of the circulating lubricant; said means for providing such loading force comprising a pressure chamber housed within an immersion chamber forming a part of the lubricant path between said pressure-responsive regulating valve and lubricant container, a floating plunger subject to liquid pressure within said pressure chamber axially disposed in relation to and bearing on said regulating valve, a restricted orifice member having a resistance to flow which varies directly with the viscosity of fluid passing therethrough and leading out of said pressure chamber into the immersion chamber, and means including a constant output pilot pump for circulating into the pressure chamber and out through the restricted orifice leading therefrom a portion of the lubricating fluid drawn from the system.

2. In a pressure regulating valve system for use in a liquid pressure pipe line, a regulating valve comprising a casing having an inlet for connection to said pipe line and an outlet for releasing liquid from said casing and the pipe line, a valve member controlling liquid flow from said casing, said member being urged in one direction of movement, and means opposing movement of said valve member in said direction by a force which increases with increases in viscosity of the liquid in said pipe line, said means comprising a pressure chamber having a restricted outlet orifice, a floating plunger slidably mounted in a wall of said pressure chamber, said floating plunger bearing upon and disconnected from said valve member, a constant output pilot pump for withdrawing liquid from said pipe line and delivering the same to said pressure chamber, the restricted outlet orifice of said pressure chamber imposing a resistance to flow which varies directly with the viscosity of the liquid passing therethrough.

3. In a pressure regulating valve system as recited in claim 2, wherein said restricted outlet orifice comprises a conical valve seat leading out of said pressure chamber, in combination with an adjustable conical valve member cooperating with said conical valve seat.

4. In a pressure regulating valve system as recited in claim 2, wherein the casing of said regulating valve has an annular valve seat disposed between said inlet and outlet, said valve member is a ball valve cooperating with said annular seat; and the floating plunger contacts said ball valve and opposes movement thereof by the liquid pressure within said pipe line.

5. In a pressure regulating valve system as recited in claim 2, wherein said regulating valve casing has an inlet opening and a pair of outlet openings, and said valve member is directly movable by said floating plunger to vary the relative rates of flow through said outlet openings.

6. In a liquid pressure system, the combination with a container for liquid, a main pipe line leading back to the liquid container, and a pump which draws liquid from said liquid container and supplies the same to said pipe line in greater volume than is at any time used in the system; of pressure release means to release excess liquid in a continuous stream from said system and to restrict this stream to regulate the pressure of the said system to a value directly proportional to the magnitude of the absolute viscosity of the liquid within the said system; said pressure release means being connected into the system at the termination of the line leading back to the liquid container and comprising a housing having an inlet for connection to the said main pipe line and an outlet, a valve member in said housing between said inlet and said outlet, a pressure chamber axially disposed in relation to said release valve housing, a floating plunger subject to liquid pressure within said pressure chamber bearing on said valve member, an immersion chamber surrounding said pressure chamber and through which passes the stream of excess liquid released through the outlet of said housing on its path back to the container, the said valve member being movable in one direction by liquid pressure within the system to effect release and being loaded automatically in the opposite direction by said floating plunger, a flow-restricting outlet orifice affording communication between the pressure and immersion chambers, said flow-restricting orifice being so constructed and arranged as to impose a resistance to flow directly proportional in magnitude to the viscosity of the liquid passing therethrough, and a constant output pilot pump to draw liquid from the main pipe line, and to deliver same into the pressure chamber, whereby the flow of liquid through the restricting outlet orifice at a constant rate irrespective of the viscosity of the liquid builds up an appreciable pressure in said pressure chamber due to the restriction imposed by that orifice, said pressure varying in direct relation to the absolute viscosity of the liquid passing through said orifice and acting on the inner end of the floating plunger for loading and controlling the pressure release means in accordance with the viscosity of the liquid circulated in said main pipe line of the liquid pressure system.

7. A lubricating system of the type including a pump circulating lubricant in a closed path from and back to a lubricant container, branch pipes extending from said closed path to lubricant points, an adjustable pressure-responsive valve situated at the terminal end of the closed path leading back into the lubricant container, said valve being movable in one direction by the liquid pressure within said system for regulating the liquid pressure within said closed path, and means for subjecting said valve to a motion-opposing force which varies directly with the viscosity of the liquid circulating within the system, whereby the system pressure varies directly with the viscosity of the circulating lubricant and enables rates of feed to lubricating points to be readily maintained at a constant value despite changes in liquid viscosity; said means for providing such motion-opposing force comprising a pressure chamber housed within an immersion chamber forming a part of the lubricant path between the pressure-responsive regulating valve and the lubricant container, a floating plunger subject to liquid pressure within said pressure chamber and axially disposed in relation to and bearing on said regulating valve, a restricted orifice means having a resistance to flow directly proportional to viscosity leading out of said pressure chamber into the immersion chamber, and means including a constant output pilot pump for circulating into the pressure chamber and out through the restricted orifice means a portion of the lubricating fluid drawn from the system.

8. A lubricating system according to claim 5, wherein the constant output pilot pump has an inlet communicating with the immersion chamber to draw lubricating fluid therefrom.

9. In a control arrangement for regulating the liquid pressure in a pipe line in accordance with the viscosity of the liquid; an immersion chamber, a pressure chamber at least partially immersed in said chamber and having a restricted outlet orifice opening into said immersion chamber, a constant output pilot pump for withdrawing liquid from said pipe line and delivering the same to said pressure chamber, said outlet orifice imposing a restriction to flow which varies in the same sense as the change in viscosity of the liquid passing therethrough, a floating member subject to pressure within the pressure chamber as said pressure varies with the viscosity of the liquid drawn from said pipe line and forced through the pressure chamber by said pump, controlling communication between said pipe line and immersion chamber, and a valve for relieving pressure in said pipe line and movable towards open position by the liquid pressure within the pipe line, said floating member contacting said valve and exerting thereon a valve-closing force which varies with the pressure established in said pressure chamber.

10. A pressure regulating system for use in a liquid pressure pipe line, said system including a pressure chamber having a restricted outlet orifice which imposes a resistance to flow varying directly with the viscosity of the liquid passing therethrough, means for adjusting the size of said orifice, a constant output pilot pump arranged to supply liquid from said pipe line under pressure to said pressure chamber, a casing with inlet and outlet openings for connecting the same in the pipe line, means including floating plunger means slidably mounted in a wall of said pressure chamber arranged to move in one direction to control fluid flow through said openings and to oppose such movement in said one direction by pressure in said pressure chamber which increases progressively with increases in viscosity of the liquid supplied to the pressure chamber.

11. A pressure regulating system for use in a liquid pressure pipe line, said system including a pressure chamber having a restricted outlet orifice adjustable by screw means to impose a resistance to flow varying directly with the viscosity of the fluid passing therethrough, a constant output pilot pump arranged to supply liquid from said pipe line under pressure to said pressure chamber, a floating plunger slidably mounted in a wall of said pressure chamber, a casing with inlet and outlet openings for connecting the same in the pipe line, and pressure relief means controlling fluid flow through said openings, said means being urged in one direction by the liquid and loaded by said floating plunger to oppose such movement in said one direction by pressure in said pressure chamber which increases progressively with increase in viscosity of the liquid supplied to the pressure chamber.

12. In a liquid pressure system of the type including a valve member movable in one direction by the liquid pressure within said system, apparatus for opposing such movement of the valve member with a force that increases with increases in the viscosity of the liquid, said apparatus comprising a pressure chamber having an adjustable restricted outlet orifice which imposes a resistance to flow varying directly with the viscosity of the liquid passing therethrough, a constant output pilot pump for delivering liquid to said pressure chamber, and a floating plunger having an end exposed to liquid pressure within said pressure chamber and an end bearing upon said valve member.

13. A pressure regulating valve system for use in a liquid pressure pipe line, said valve system including a pressure relief valve member of the ball type in said pipe line, said ball being urged from its seat by the liquid pressure in the line, a floating plunger one end of which bears upon said ball to oppose movement thereof by the liquid pressure, a pressure chamber having a restricted outlet orifice adjustable by screw means and which imposes a resistance to flow directly proportional to the viscosity of the liquid passing therethrough, said floating plunger being slidably mounted in a wall of said pressure chamber, and a constant output pilot pump for delivering liquid to said pressure chamber above the other end of said plunger to thereby apply to said other plunger end a force which increases progressively with increases in viscosity of the liquid supplied to the pressure chamber.

14. In a fluid pressure system, a high pressure pipe line, a pump for delivering fluid under pressure to said pipe line, and pressure responsive means controlling flow of fluid in said pipe line, said means including a movable valve member upon which fluid within the pipe line exerts pressure tending to move the valve member in one direction, a pressure chamber, a pilot pump for delivering fluid from said pipe line to said pressure chamber, said pressure chamber having a restricted outlet orifice imposing a resistance to flow which varies directly with the viscosity of the fluid delivered by said pump, and means including a floating member subject to the fluid pressure within said pressure chamber opposing movement of said valve member in said one direction with a force which increases progressively with increases in viscosity of the fluid supplied to said pressure chamber.

CECIL CYPRIAN HIGGENS.

REFERENCES CITED

The following references are of record in the file of this patent:

UNITED STATES PATENTS

| Number | Name | Date |
|---|---|---|
| 1,314,562 | Appleyard | Sept. 2, 1919 |
| 1,604,672 | Albershein | Oct. 26, 1926 |
| 1,641,673 | Hall | Sept. 6, 1927 |
| 1,654,614 | Smith | Jan. 3, 1928 |
| 1,685,976 | Blanchard | Oct. 2, 1928 |
| 2,020,773 | Ernst | Nov. 12, 1935 |
| 2,103,299 | Ravensbeck | Dec. 28, 1937 |
| 2,134,778 | Clarke | Nov. 1, 1938 |
| 2,136,040 | Clarke | Nov. 8, 1938 |
| 2,138,969 | Hobbs | Dec. 6, 1938 |
| 2,140,735 | Clarke | Dec. 20, 1938 |
| 2,288,127 | Dykeman | June 30, 1942 |
| 2,322,814 | Binckley | June 29, 1943 |

FOREIGN PATENTS

| Number | Country | Date |
|---|---|---|
| 796,850 | France | 1936 |

Certificate of Correction

Patent No. 2,434,798. January 20, 1948.

CECIL CYPRIAN HIGGENS

It is hereby certified that error appears in the printed specification of the above numbered patent requiring correction as follows: Column 13, lines 29 and 30, claim 9, strike out the words and comma "controlling communication between said pipe line and immersion chamber,"; line 31, same claim, before "for" insert *controlling communication between said pipe line and immersion chamber*; and that the said Letters Patent should be read with this correction therein that the same may conform to the record of the case in the Patent Office.

Signed and sealed this 13th day of April, A. D. 1948.

[SEAL]

THOMAS F. MURPHY,
*Assistant Commissioner of Patents.*